(12) United States Patent
Jang et al.

(10) Patent No.: US 11,211,872 B1
(45) Date of Patent: Dec. 28, 2021

(54) POWER-FACTOR-CORRECTION RECTIFIERS WITH SOFT SWITCHING

(71) Applicant: DELTA ELECTRONICS, INC., Neihu (TW)

(72) Inventors: Yungtaek Jang, Cary, NC (US); Misha Kumar, Research Triangle Park, NC (US); Tomas Sadilek, Durham, NC (US); Peter Barbosa, Durham, NC (US)

(73) Assignee: DELTA ELECTRONICS, INC., Neihu (TW)

(*) Notice: Subject to any disclaimer, the term of this patent is extended or adjusted under 35 U.S.C. 154(b) by 0 days.

(21) Appl. No.: 17/034,446

(22) Filed: Sep. 28, 2020

(51) Int. Cl.
*H02M 1/42* (2007.01)
*H02M 3/335* (2006.01)
*H02M 7/219* (2006.01)
*H02M 1/00* (2006.01)

(52) U.S. Cl.
CPC ..... *H02M 3/33569* (2013.01); *H02M 1/4241* (2013.01); *H02M 7/219* (2013.01); *H02M 1/0016* (2021.05); *H02M 1/0058* (2021.05); *H02M 1/425* (2013.01); *H02M 1/4208* (2013.01); *H02M 1/4283* (2021.05)

(58) Field of Classification Search
CPC ... H02M 1/4208; H02M 1/425; H02M 1/4283
USPC ........................................... 363/44, 89, 126
See application file for complete search history.

(56) References Cited

U.S. PATENT DOCUMENTS

| | | | | |
|---|---|---|---|---|
| 5,499,178 A | * | 3/1996 | Mohan | H02M 1/12 363/39 |
| 8,687,388 B2 | * | 4/2014 | Jang | H02M 1/4216 363/44 |
| 9,929,636 B2 | * | 3/2018 | Shinomoto | H02P 27/08 |
| 2001/0035731 A1 | * | 11/2001 | Luerkens | H02P 27/06 318/727 |
| 2011/0019452 A1 | * | 1/2011 | Shinomoto | H02M 7/217 363/126 |

(Continued)

OTHER PUBLICATIONS

"Current Harmonics Limits for Single-Phase Equipment", https://www.rtca.org/content/publications.

(Continued)

*Primary Examiner* — Gary A Nash
(74) *Attorney, Agent, or Firm* — Edward C. Kwok; VLP Law Group, LLP

(57) ABSTRACT

A boost rectifier that operates with a single-phase input voltage includes (i) an input stage receiving the single-phase input voltage and including first and second input filter capacitors, (ii) a switching converter stage coupled to the input stage and including a rectification circuit and an inductor circuit, series-connected first and second switches providing a common terminal therebetween, and a phase output capacitor, (iii) an output stage that transfers energy stored in the phase output capacitor to an output load, (iv) a decoupling stage that provides high-impedance decoupling between the switching converter stage and the output stage, and (v) a control circuit configured to operate the first and second switches according to an output signal of a non-linear compensation circuit that combines a feedforward signal derived from both the input and output voltages of the boost rectifier with an output voltage feedback control signal.

20 Claims, 18 Drawing Sheets

(56) References Cited

U.S. PATENT DOCUMENTS

| 2013/0235626 | A1* | 9/2013 | Jang | H02M 5/4585 |
| | | | | 363/37 |
| 2016/0352216 | A1* | 12/2016 | Sonnaillon | H02M 1/4208 |
| 2019/0252967 | A1* | 8/2019 | Sokolov | H05B 45/36 |

OTHER PUBLICATIONS

Chen, Fu-Zen, et al., "Digital control for improved efficiency and reduced harmonic distortion over wide load range in boost PFC rectifiers", IEEE Trans. Power Electron., vol. 25, No. 10, Oct. 2010, pp. 2683-2692.

He, Jiangbiao, et al., "Recent Advances of Power Electronics Applications in More Electric Aircrafts", AIAA/IEEE Electric Aircraft Technologies Symposium (EATS), Cincinnati, OH, 2018, pp. 1-8.

Huang, Qingyun, et al., "Review of GaN totem-pole bridgeless PFC", CPSS Transactions on Power Electronics and Applications, vol. 2, No. 3, Sep. 2017, pp. 187-196.

Huber, Laszlo, et al., "Performance Evaluation of Bridgeless PFC Boost Rectifiers", IEEE Transactions on Power Electronics, vol. 23, No. 3, May 2008, pp. 1381-1390.

Jang, Yungtaek, et al., "A new input-voltage feedforward harmonic-injection technique with nonlinear gain control for single-switch, three-phase, DCM boost rectifiers", IEEE Transactions on Power Electronics, vol. 28, No. 1, Mar. 2000, pp. 268-277.

Jang, Yungtaek, et al., "A Two-Switch, Isolated, Three-Phase AC-DC Converter", IEEE Applied Power Electronics Conference and Exposition (APEC), 2018, 12 pages.

Jang, Yungtaek, et al., "A Two-Switch, Isolated, Three-Phase AC-DC Converter", IEEE Transactions on Power Electronics, vol. 34, Issue: 11, Nov. 2019, pp. 60-67.

Jang, Yungtaek, et al., "The TAIPEI Rectifier—A New Three-Phase Two-Switch ZVS PFC DCM Boost Rectifier", IEEE Transactions on Power Electronics, vol. 28, Issue 2, Feb. 2013, pp. 686-694.

Lee, Fred C., et al., "Application of GaN devices for 1 kW server power supply with integrated magnetics", CPSS Transactions on Power Electronics and Applications, vol. 1, No. 1, Dec. 2016, pp. 3-12.

Lim, Shu Fan, et al., "A Simple Digital DCM Control Scheme for Boost PFC Operating in Both CCM and DCM", IEEE Transactions on Industry Applications, vol. 47, No. 4, Jul.-Aug. 2011, pp. 1802-1812.

Liu, Zhengyang, et al., "Design of GaN-Based MHz Totem-Pole PFC Rectifier", IEEE Journal of Emerging and Selected Topics in Power Electronics, vol. 4, No. 3, Sep. 2016, pp. 799-807.

Lu, Jiangheng, et al., "Dynamic Strategy for Efficiency Estimation in a CCM-Operated Front-End PFC Converter for Electric Vehicle Onboard Charger", EEE Transactions on Transportation Electrification, vol. 3, No. 3, Sep. 2017, pp. 545-553.

Sarlioglu, Bulent, "Advances in AC-DC power conversion topologies for More Electric Aircraft", IEEE Transportation Electrification Conference and Expo (ITEC), Dearborn, MI, 2012, pp. 1-6.

Wheeler, Pat, "Technology for the more and all electric aircraft of the future", IEEE International Conference on Automatica (ICA-ACCA), Curico, 2016, pp. 1-5.

Xue, Lingxiao, et al., "GaN-based high frequency totem-pole bridgeless PFC design with digital implementation", IEEE Applied Power Electronics Conference and Exposition (APEC), Charlotte, NC, 2015, pp. 759-766.

* cited by examiner

400

400

POWER-FACTOR-CORRECTION RECTIFIERS WITH SOFT SWITCHING

BACKGROUND OF THE INVENTION

1. Field of the Invention

The present invention relates to front-end rectifiers with power-factor correction (PFC). More particularly, the present invention relates to single-phase PFC rectifiers with soft switching.

2. Discussion of the Related Art

In the aviation industry, electric power loads and source properties are regulated by the DO-160 standard (https://www.rtca.org/content/publications), which specifies stringent harmonic limits on airborne power equipment. Moreover, modern airborne power distribution systems use line frequencies that are up to 800 Hz to increase the performance of on-board generators and to reduce the sizes of on-board passive elements (e.g., transformers and filters). See, e.g., the articles: (i) "Technology for the more and all electric aircraft of the future," by P. Wheeler, published in 2016 *IEEE International Conference on Automatica (ICA-ACCA)*, Curico, 2016, pp. 1-5; (ii) "Advances in AC-DC power conversion topologies for More Electric Aircraft," by B. Sarlioglu, published in 2012 *IEEE Transportation Electrification Conference and Expo (ITEC)*, Dearborn, Mich., 2012, pp. 1-6; and (iii) "Recent Advances of Power Electronics Applications in More Electric Aircrafts," by J. He et al., published in *AIAA/IEEE Electric Aircraft Technologies Symposium (EATS)*, Cincinnati, Ohio, 2018, pp. 1-8.

FIG. 1 shows a conventional continuous-conduction-mode (CCM) PFC boost rectifier that is optimized to a line frequency of 50 or 60 Hz by an active input current-shaping control scheme that has a bandwidth of around 3-5 kHz and low total harmonic distortion (THD). To achieve a similar current-shaping performance at a line frequency of 800 Hz, the current-shaping control bandwidth should be about 50 kHz. However, a current-shaping control scheme with such a wide bandwidth is difficult to achieve in a hard-switching CCM PFC boost rectifier, as most of them are designed to operate at a 100-kHz switching frequency or lower, so that the CCM PFC boost rectifier may meet required efficiency and thermal performance See, e.g., the articles: (i) "A Simple Digital DCM Control Scheme for Boost PFC Operating in Both CCM and DCM," by S. F. Lim et alius, published in *IEEE Transactions on Industry Applications*, vol. 47, no. 4, pp. 1802-1812, July-August 2011; (ii) "Digital control for improved efficiency and reduced harmonic distortion over wide load range in boost PFC rectifiers," by F. Chen et alius, published in *IEEE Trans. Power Electron.*, vol. 25, no. 10, pp. 2683-2692, October 2010; and (iii) "Dynamic Strategy for Efficiency Estimation in a CCM-Operated Front-End PFC Converter for Electric Vehicle Onboard Charger," by J. Lu et al., published in *IEEE Transactions on Transportation Electrification*, vol. 3, no. 3, pp. 545-553, September 2017; and (iv) "Performance Evaluation of Bridgeless PFC Boost Rectifiers," by L. Huber, et al., in IEEE Transactions on Power Electronics, vol. 23, no. 3, pp. 1381-1390, May 2008.

FIG. 2 shows a conventional totem-pole, bridgeless PFC rectifiers with wide-bandgap (WBG) devices, operating in the critical conduction mode. Some examples of such PFC rectifiers are disclosed in the articles: (i) "Review of GaN totem-pole bridgeless PFC," by Q. Huang et alius, published in CPSS Transactions on Power Electronics and Applications, vol. 2, no. 3, pp. 187-196, September 2017; (ii) "Design of GaN-Based MHz Totem-Pole PFC Rectifier," by Z. Liu et al., published in IEEE Journal of Emerging and Selected Topics in Power Electronics, vol. 4, no. 3, pp. 799-807, September 2016; (iii) "Application of GaN devices for 1 kW server power supply with integrated magnetics," by F. C. Lee et al., published in CPSS Transactions on Power Electronics and Applications, vol. 1, no. 1, pp. 3-12, December 2016.

To achieve low THD in a PFC boost rectifier, zero-crossing of both the boost inductor current and the line input voltage must be properly detected without significant delay. However, existing current sensing techniques—when applied to commercially available gate drivers with propagation delay and digital controllers with limited processing speed—are incapable of delivering performance of less than 5% THD at 800 Hz line frequency. See, e.g., the article, "GaN-based high frequency totem-pole bridgeless PFC design with digital implementation," by L. Xue et al., published in 2015 IEEE Applied Power Electronics Conference and Exposition (APEC), Charlotte, N.C., 2015, pp. 759-766.

U.S. Pat. No. 8,687,389 ("Jang"), entitled "Three-phase soft-switched PFC rectifier" to Y. Jang et al., discloses PFC rectifiers operating in three-phase input voltage applications. Jang's rectifiers achieve a good power factor and low THD for three-phase input voltages, even at high line frequencies, without an additional high-bandwidth, active current-shaping control scheme. In such a PFC rectifier, when the neutral line of the three-phase input source is isolated from the PFC rectifier, even though power can be delivered through a three-phase input connection, triplen harmonics (i.e., the 3rd harmonic and the odd multiples of the 3rd harmonic) contained in the input current cannot flow through the three-phase input connection. As a result, the triplen-harmonic currents in the PFC rectifier circulate through the input filter capacitors and not reflected to the input port, thus providing the PFC rectifier a good power factor. When operating in a single-phase system, however, power cannot be delivered without the neutral connection. Hence, as the triplen harmonic currents in the PFC rectifier flow through the neutral line at the single-phase input port, resulting in a poor power factor for the single-phase system.

SUMMARY OF THE INVENTION

The present disclosure provides a boost rectifier that operates with a single-phase input voltage and a control circuit that operates according to a non-linear compensation signal. The boost rectifier provides zero-voltage switching (ZVS) and regulate a switching frequency by injecting a feedforward signal to achieve low input-current total harmonic distortion (THD).

According to one embodiment of the present invention, a PFC, discontinuous-conduction-mode (DCM) boost rectifier is provided with a non-linear compensation circuit, which allows the PFC DCM boost rectifier to achieve both zero-voltage switching (ZVS) and a 5% or less input-current THD. The non-linear compensation circuit combines a feed-forward signal that is derived from both the input and output voltages of the PFC DCM boost rectifier with an output voltage feedback control signal. Because low THD is achieved without an additional wide-bandwidth, active current shaping control scheme, PFC boost rectifiers of the present invention are suitable for high-frequency line voltage applications (e.g., aviation industry). The resulting efficiency leads to a high power-factor (HPF). In addition, the PFC DCM boost rectifiers of the present invention have reduced common-mode noise.

In accordance with one embodiment of the present invention, a boost rectifier operates with a single-phase input voltage and may include an input stage, a switching converter stage, an output stage, a decoupling stage, and a control circuit. The input stage may include first and second terminals across which receives the single-phase input voltage; and first and second input filter capacitors. The switching converter stage may include a rectification and inductor circuit coupled between the input terminals of the first and second terminals of the input stage and first and second phase terminals, series-connected first and second switches providing a common terminal therebetween, and a phase output capacitor connected between the first and second phase terminals. The rectification and inductor circuit may include a rectification circuit and first and second boost inductors. The common terminal of the series-connected first and second switches is coupled by the first and second filter capacitors to the first and second terminals of the input stage, respectively. The output stage transfers energy stored in the phase output capacitor to an output load. The decoupling stage provides high-impedance decoupling between the switching converter stage and the output stage. The control circuit may operate the first and second switches according to a non-linear compensation signal derived from (i) a magnitude of the single-phase input voltage; and (ii) a voltage across the output load or a current in the output load.

The present invention is better understood upon consideration of the following detailed description and accompanying figures.

DETAILED DESCRIPTION OF THE PREFERRED EMBODIMENTS

Figure 1:
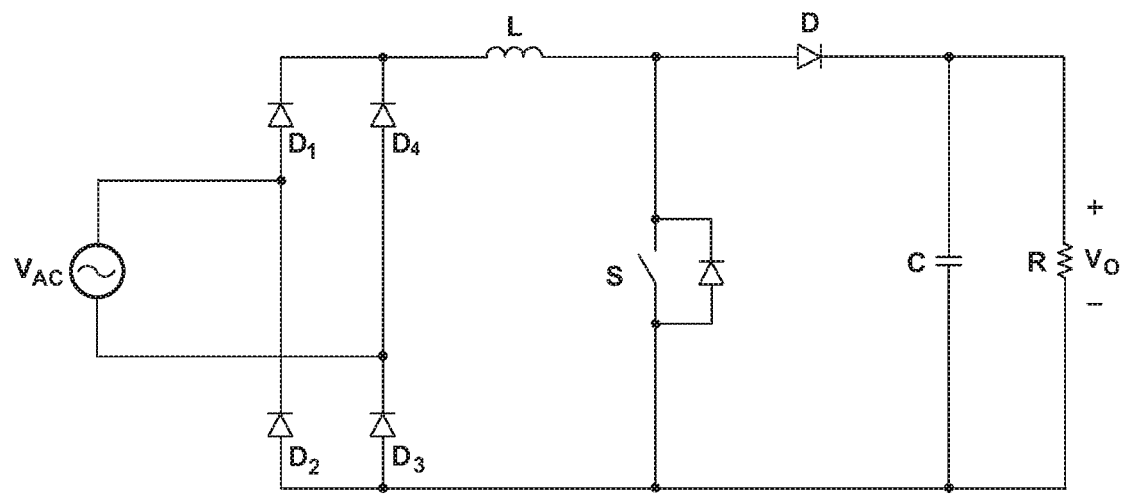
FIG. 1 shows a conventional continuous-conduction-mode (CCM) PFC boost rectifier that is optimized to a line frequency of 50 or 60 Hz by an active input current-shaping control scheme that has a bandwidth of around 3-5 kHz and low total harmonic distortion (THD).
Figure 2:
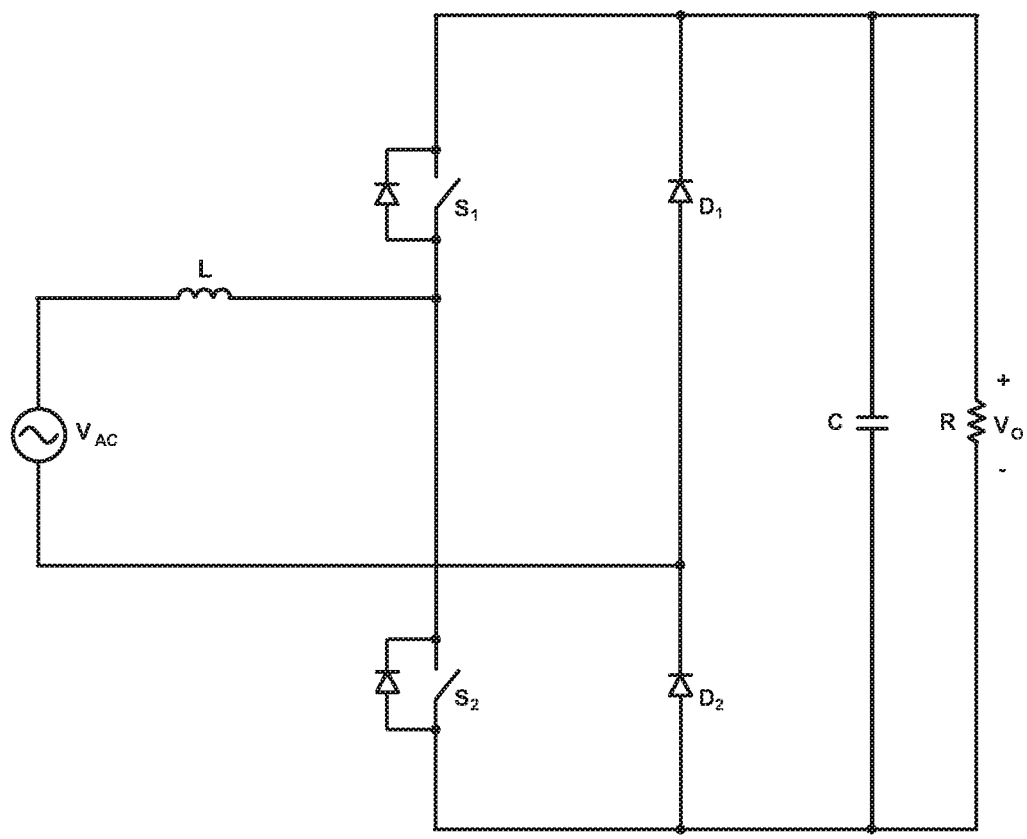
FIG. 2 shows a conventional totem-pole, bridgeless PFC rectifiers with wide-bandgap (WBG) devices operating in the critical conduction mode.
Figure 3:
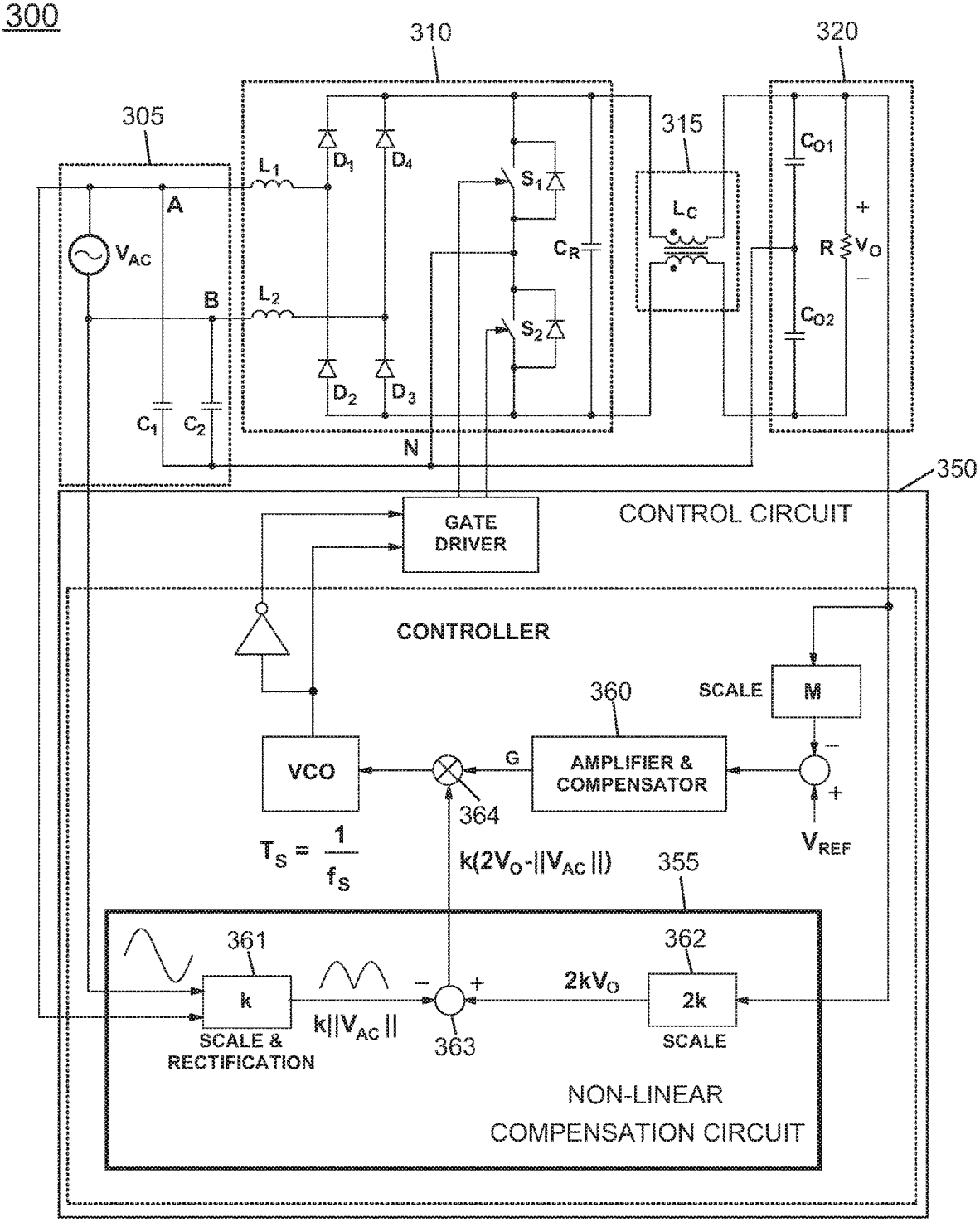
FIG. 3 shows boost rectifier 300 that operates with ZVS, in accordance with one embodiment of the present invention.

FIG. 3 shows boost rectifier 300 that operates with ZVS, in accordance with one embodiment of the present invention. As shown in FIG. 3, boost rectifier 300 includes input stage 305, switching converter stage 310, decoupling stage 315, control circuit 350, and output stage 320. Input stage 305 includes single-phase input voltage source $V_{AC}$ and input filter capacitors $C_1$ and $C_2$. Switching converter stage 310 includes boost inductors $L_1$ and $L_2$, each respectively coupled between one of the terminals of input voltage source $V_{AC}$ and one of the input terminals of a rectification circuit. In this embodiment, the rectification circuit includes diodes D1, D2, D3 and D4 connected in a full-bridge configuration as a full-bridge rectifier. Switching converter stage 310 also includes flying capacitor $C_R$ (also referred to herein as a "phase output capacitor") and series-connected switches $S_1$ and $S_2$ with a common terminal (common node N, electrically) between them. Both flying capacitor $C_R$ and series-connected switches $S_1$ and $S_2$ are connected across the phase terminals of switching converter stage 310 (in this case, the output terminals of the rectification circuit). Input filter capacitors $C_1$ and $C_2$ are each connected between one of the terminals of input voltage source $V_{AC}$ and common node N between switches $S_1$ and $S_2$. Decoupling stage 315 includes coupled inductor $L_C$ that isolates common-mode noise of the output terminals of switching converter stage 310—i.e., across capacitor $C_R$—from output stage 320. Output stage 320 includes series-connected output filter capacitors $C_{O1}$ and $C_{O2}$ which have a common terminal between them electrically tied to node N. The common node between series-connected output filter capacitors $C_{O1}$ and $C_{O2}$ is coupled to the common node between output filter capacitors $C_{O1}$ and $C_{O2}$. In FIG. 3, output voltage $V_O$ of boost rectifier 300 is imposed across a resistive output load, which is represented by resistor R. In this embodiment, boost rectifier 300 is a PFC DCM boost rectifier.

Input filter capacitors $C_1$ and $C_2$ provide at common node N an intermediate voltage between the peak and the trough of input voltage source $V_{AC}$ (e.g., one-half of the amplitude of input voltage $V_{AC}$). In this configuration, the voltage at common point N decouples the two currents in boost inductors $L_1$ and $L_2$—i.e., the current in inductor $L_1$ depends only on phase voltage $V_{AN}$ across capacitor $C_1$, and the current in inductor $L_2$ depends only on phase voltage $V_{BN}$ across capacitor $C_2$. In this embodiment, phase voltages $V_{AN}$ and $V_{BN}$ have substantially equal magnitudes, but opposite polarities. Specifically, when switch $S_1$ is closed during the positive half-cycle of input voltage $V_{AC}$, input filter capacitor $C_1$ delivers a current through series-connected inductor $L_1$ and switch $S_1$. Likewise, when switch $S_2$ is closed during the negative half-cycle of input voltage $V_{AC}$, input capacitor $C_2$ delivers a current through series-connected inductor $L_2$ and switch $S_2$. When switch $S_1$ is open, the stored energy in inductor $L_1$ is delivered to flying capacitor $C_R$. Likewise, when switch $S_2$ is open, the stored energy in inductor $L_2$ is delivered to flying capacitor $C_R$.

Coupled inductor $L_C$ isolate flying capacitor $C_R$ from output stage 320, so as to reduce the unacceptable common-mode electromagnetic interference (EMI) noise arising from the rapid voltage changes between the terminal at common node N and each of the terminals of flying capacitor $C_R$ (i.e., the large rate of voltage change $$\left(\frac{dv}{dt}\right)$$

over the relevant portions of each switching cycle. In this configuration, output common-mode noise is very low, as it is contained in a relatively small circuit or "loop" that includes switches $S_1$ and $S_2$ and flying capacitor $C_R$. Moreover, with coupled inductor $L_C$ providing an impedance between output stage 320 and switches $S_1$ and $S_2$, parallel or interleaving operations among multiple parallel rectifiers are possible (i.e., multiple switching converter stages may be coupled in parallel by decoupling stages to the same output stage), FIG. 3 also shows a block diagram of control circuit 350 that combines a feedforward signal with an output voltage feedback control signal. The feedforward signal is derived from both input and output voltages of PFC DCM boost rectifier 300. A feedforward control signal responds steer the control system in a predetermined manner, independent of the output load. In contrast, a feedback control signal causes the control system to respond to the output load. In one embodiment, control circuit 350 includes a controller and a gate driver circuit that operates switches $S_1$ and $S_2$ according to a non-linear compensation signal derived from (i) a magnitude of the single-phase input voltage; and (ii) a voltage across the output load or a current in the output load.

As shown in FIG. 3, control circuit 350 includes non-linear compensation circuit 355, which receives, rectifies, and scales input voltage $V_{AC}$ at scale and rectification circuit 361 to provide scaled rectified voltage $k\|V_{AC}\|$. Scaled rectified voltage $k\|V_{AC}\|$ is then subtracted at summer 363 from scaled voltage $2\,kV_O$, which is derived from output voltage Vo and output from scale circuit 362. Summer 363 provides a non-linear compensation term that represents the voltage difference $k(2V_O-\|V_{AC}\|)$. This non-linear compensation term is then multiplied at multiplier 364 with compensation signal G from amplifier and compensator 360. Signal G is derived from a feedback signal based on output voltage $V_O$. The product ("non-linear control signal") of compensation signal G and the non-linear compensation signal drives voltage-controlled oscillator VCO, which generates the gate signals that control switches $S_1$ and $S_2$. The gate signals for switches $S_1$ and $S_2$ are alternate, non-overlapping pulses with approximately 50% duty cycle, with a switching period $T_S$ that is proportional to the product of the non-linear control signal and the substantially constant gain of voltage-controlled oscillator VCO. In this manner, control circuit 350 may provide in PFC DCM boost rectifier 300 both a low THD and a desirable HPF without an active current-shaping control scheme. In this embodiment, non-linear compensation circuit 355 is integrated into a controller, which is part of control circuit 350. In one embodiment, non-linear compensation circuit 355 is adapted to combine the feedforward signal derived from both the input and output voltages of boost rectifier 300 with an output voltage feedback control signal and generates an output signal, and control circuit 350 is adapted to operate the switches S1 and S2 according to the output signal of non-linear compensation circuit 355. In some embodiments, the non-linear compensation circuit 355 may be integrated in the controller or as a part of the control circuit 350. In some other embodiments, non-linear compensation circuit 355 and control circuit 350 may be separately provided.

Figure 4:
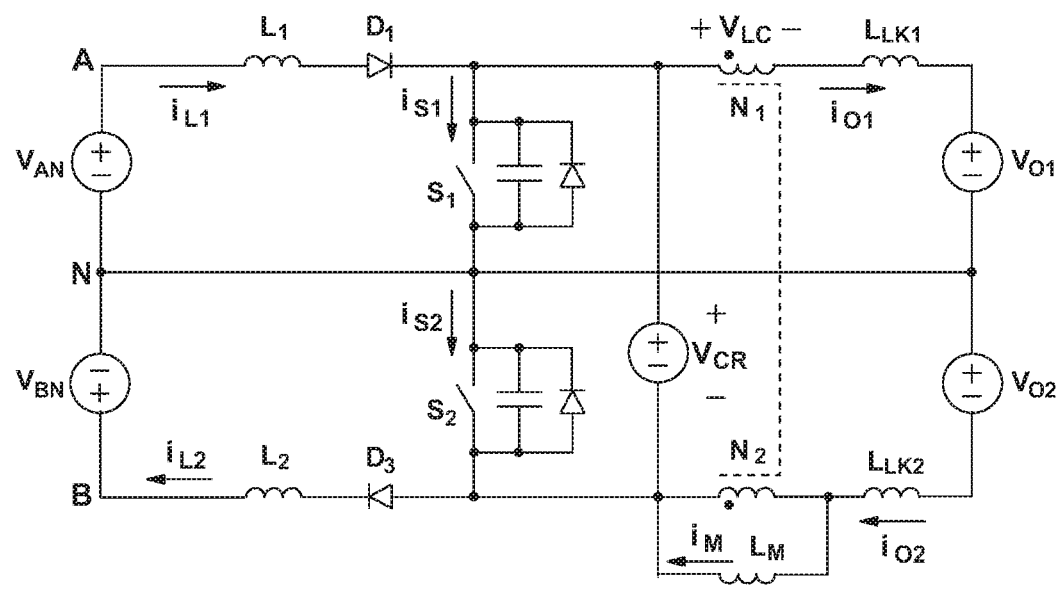
FIG. 4 shows schematic circuit representation 400 for illustrating the operations of boost rectifier 300, in accordance with one embodiment of the present invention.

FIG. 4 shows schematic circuit representation 400 for illustrating the operations of PFC DCM boost rectifier 300, in accordance with one embodiment of the present invention. As switches $S_1$ and $S_2$ have a common switching frequency that is significantly higher than the line frequency, ripple voltages in input filter capacitors $C_1$ and $C_2$, flying capacitor $C_R$, and output filter capacitors $C_{O1}$ and $C_{O2}$ may be considered negligible, so that the voltages across them may be represented, respectively, by constant-voltage sources $V_{AN}$, $V_{BN}$, $V_{CR}$, $V_{O1}$, and $V_{O2}$. In FIG. 4, in their conductor states, semiconductor switches $S_1$ and $S_2$ are deemed to have substantially zero resistance (i.e., they are considered short circuits), even though their output capacitances are not neglected in this analysis. Furthermore, coupled inductor $L_C$ is modeled in FIG. 4 as a two-winding ideal transformer with magnetizing inductance $L_M$ and leakage inductances $L_{LK1}$ and $L_{LK2}$. As the average voltage across capacitor $C_R$ is substantially equal to the output voltage $V_O$, which is the sum of voltages $V_{O1}$ and $V_{O1}$, capacitor $C_R$ is modeled as constant voltage source $V_{CR}$. In FIG. 4, the reference directions of currents and voltages correspond to a half-cycle segment in which $V_{AC}>0$, $V_{AN}>0$, and $V_{BN}<0$.

FIGS. 5A to 5I show topological stages of schematic circuit representation 400 at various segments of a common switching cycle of switches $S_1$ and $S_2$, in accordance with one embodiment of the present invention. FIG. 6 shows various power-stage key waveforms during the switching cycle of FIGS. 5A to 5I, in accordance with one embodiment of the present invention. In FIG. 6, the gate signals of switches $S_1$ and $S_2$ are labeled "$S_1$" and "$S_2$", respectively. Likewise, constants $L_1$ and $L_2$ also represent the inductance values of boost inductors $L_1$ and $L_2$, respectively.

As shown in FIG. 6, gate signals $S_1$ and $S_2$ of switches $S_1$ and $S_2$ are non-overlapping and are offset from each other by substantially 180°, with a brief dead time between opening of one switch and closing of the other (e.g., between times $T_1$ and $T_3$), thereby achieving ZVS in both switches $S_1$ and $S_2$. To maintain ZVS over varying ranges of input and output voltages, a PFC DCM boost rectifier of the present invention uses a variable switching frequency control scheme. As illustrated in this detailed description, under this variable switching frequency control scheme, a lower switching frequency correspond to a higher load or a lower input voltage, while a higher switching frequency corresponds to a lighter load or at a higher input voltage. A PFC DCM boost rectifier of the present invention may operate in a controlled burst mode or a pulse-skip mode at a very light or zero load, to avoid any unnecessarily high-frequency operation.

Figure 5A:
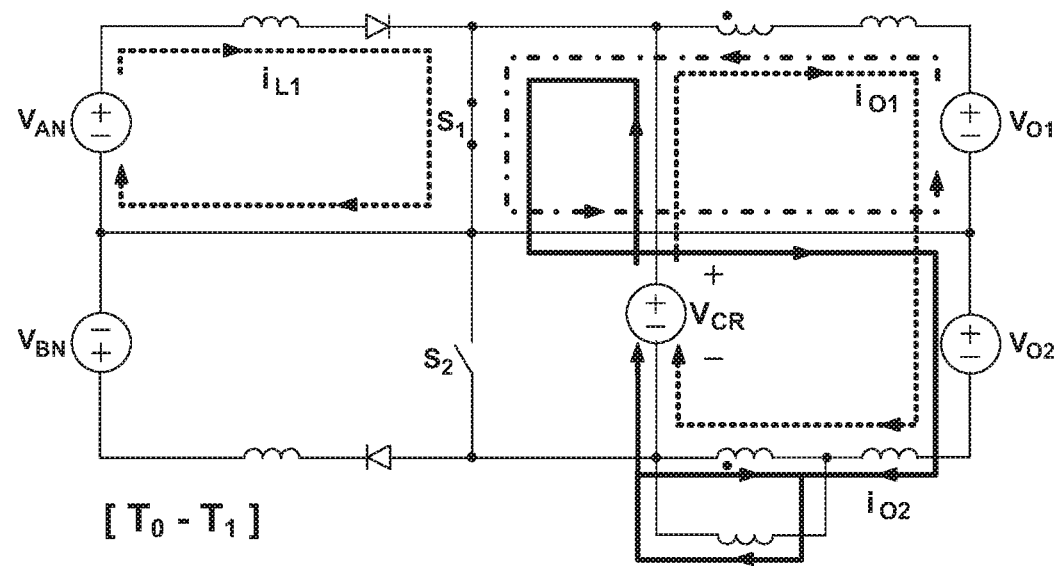
FIGS. 5A 5B, 5C, 5D, 5E, 5F, 5G, 5H and 5I show topological stages of schematic circuit representation 400 at various segments of a common switching cycle of switches $S_1$ and $S_2$, in accordance with one embodiment of the present invention.
Figure 6:
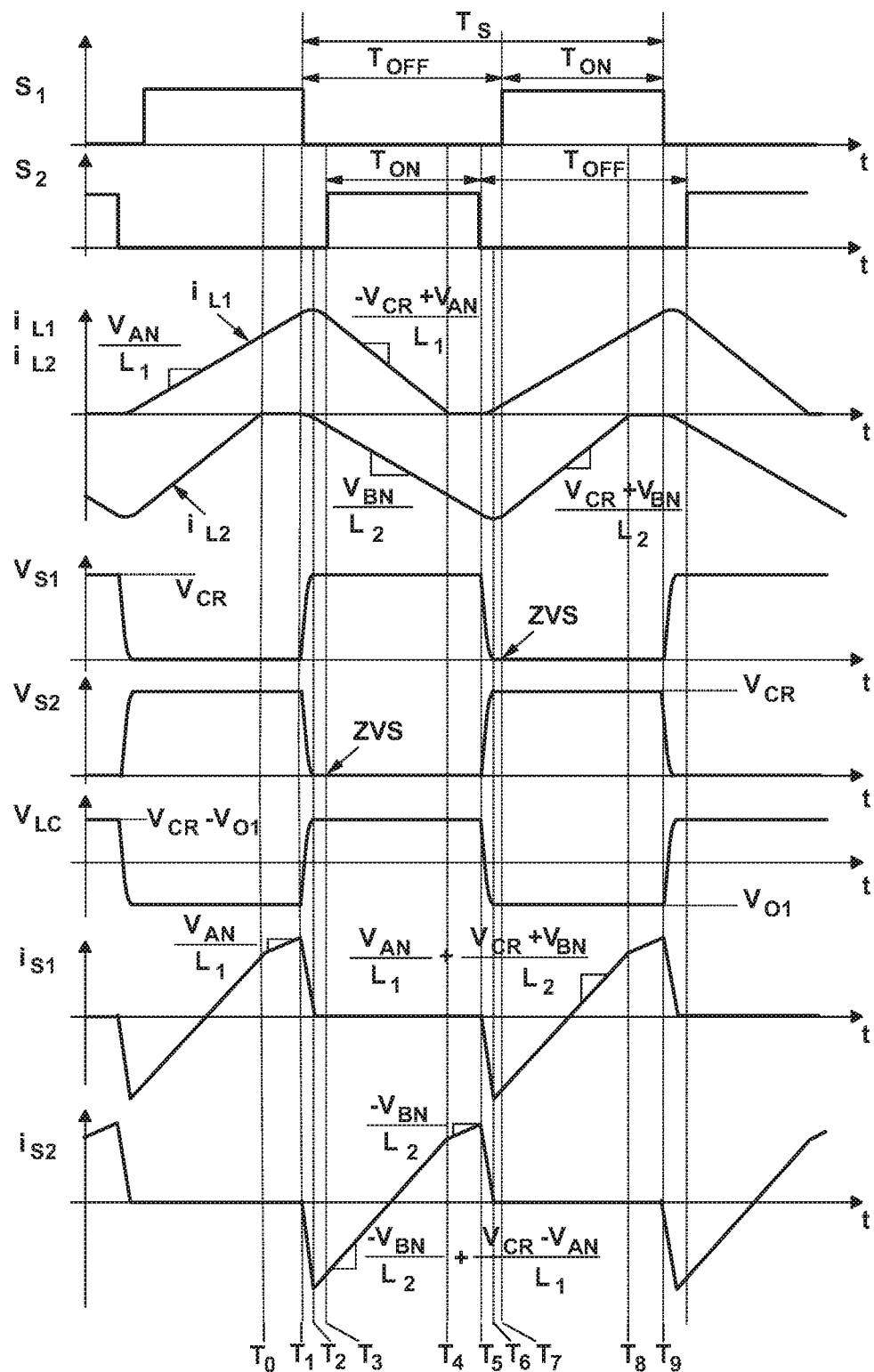
FIG. 6 shows various power-stage key waveforms during the switching cycle of FIGS. 5A to 5I, in accordance with one embodiment of the present invention.

As shown in FIGS. 5A and 6, for the period between times $T_0$ and $T_1$, while switch $S_2$ is open and just before closed switch $S_1$ opens at time $T_1$, inductor current $i_{L1}$ in boost inductor $L_1$ flows through switch $S_1$ at a rate substantially given by $V_{AN}/L_1$, and reaches peak value $I_{L1_{pk}}$ at time $T_1$, approximated by:

$$I_{L1_{pk}} = \frac{V_{AN}}{L_1} \times \frac{T_S}{2} \quad (1)$$

where $V_{AN}$ is the phase voltage across input filter capacitor $C_1$ and $T_S$ is the common switching period. Because the dead time between switch $S_1$ opening at time $T_1$ and switch $S_2$ closing at time $T_2$ is short relative to switching period $T_S$, Equation (1) does not account for time period between times $T_1$ and $T_2$. Between times $T_0$ and $T_1$, output current $i_{O1}$ ascribed to leakage inductance $L_{LK1}$ decreases at the rate $$\frac{-V_{O1}}{2L_M + L_{LK1}},$$

while output current $i_{O2}$ ascribed to leakage inductance $L_{LK2}$ increases at the rate $V_{CR}-V_{O2}/2L_M+L_{LK2}$, where $V_{CR}$ is the voltage across flying capacitor $C_R$. Magnetizing current $i_M$ ascribed to magnetizing inductance $L_M$ is given by the difference between output currents $i_{O1}$ and $i_{O2}$. In this embodiment, magnetizing inductance $L_M$ is sufficiently large such that the ripple current in coupled inductor $L_C$ does not affect the operations of the PFC DCM boost rectifier in any significant way.

As shown in FIG. 4, the two windings in coupled inductor $L_C$ cancels the magnetic fluxes from their respective differential currents in output currents $i_{O1}$ and $i_{O2}$, such that magnetizing inductance $L_M$ may be provided by a small gap in the core without saturation.

Figure 5B:
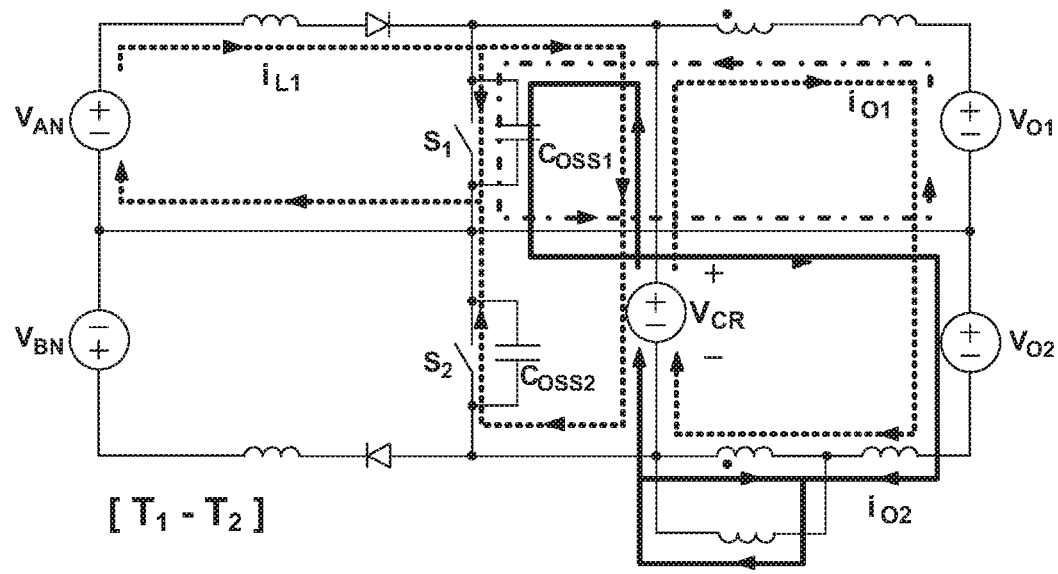

FIG. 5B shows the topological stage of schematic circuit representation 400 between times $T_1$ and $T_2$ of a switching cycle of switches $S_1$ and $S_2$, in accordance with one embodiment of the present invention. When switch $S_1$ opens at time $T_1$, inductor current $i_{L1}$ in boost inductor $L_1$ begins charging output capacitance $C_{OSS1}$ of switch $S_1$. As the sum of the voltages across switches $S_1$ and $S_2$ is constrained to voltage $V_{CR}$ across flying capacitor $C_R$, output capacitances $C_{OSS1}$ and $C_{OSS2}$ of switches $S_1$ and $S_2$ charges and discharges, respectively, at the roughly the same rate. At time $T_2$, output capacitance $C_{OSS2}$ of switch $S_2$ is fully discharged, so that the anti-parallel body diode of switch $S_2$ begins to conduct.

Figure 5C:
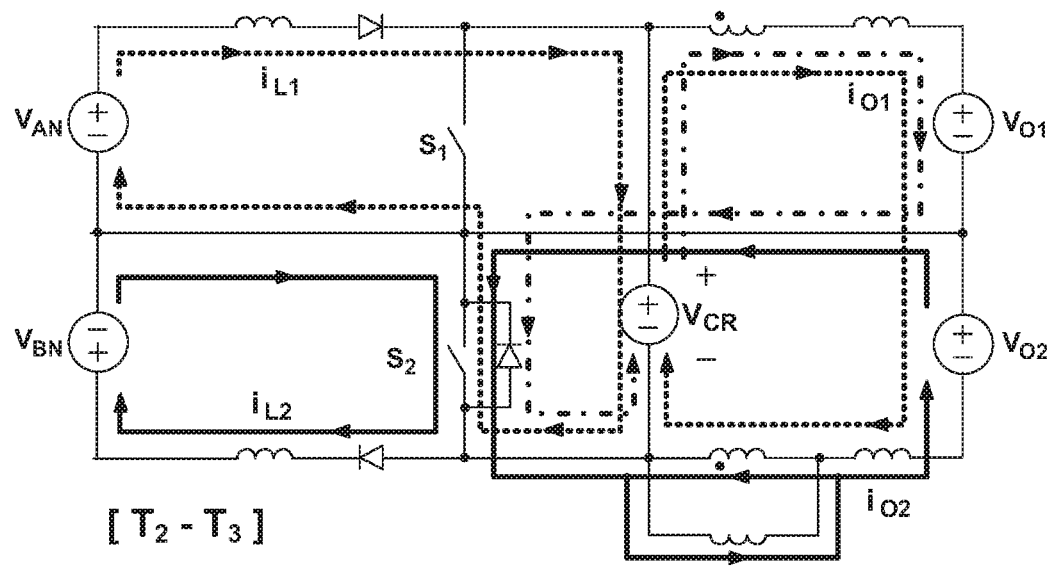

FIG. 5C shows the topological stage of schematic circuit representation 400 between times $T_2$ and $T_3$ of a switching cycle of switches $S_1$ and $S_2$, in accordance with one embodiment of the present invention. As shown in FIG. 6, as the body diode of switch $S_2$ is forward-biased at time $T_2$, inductor current $i_{L2}$ begins to increase in magnitude linearly. At time $T_3$, switch $S_2$ closes with ZVS and inductor current $i_{L2}$ begins to flow in switch $S_2$.

Figure 5D:
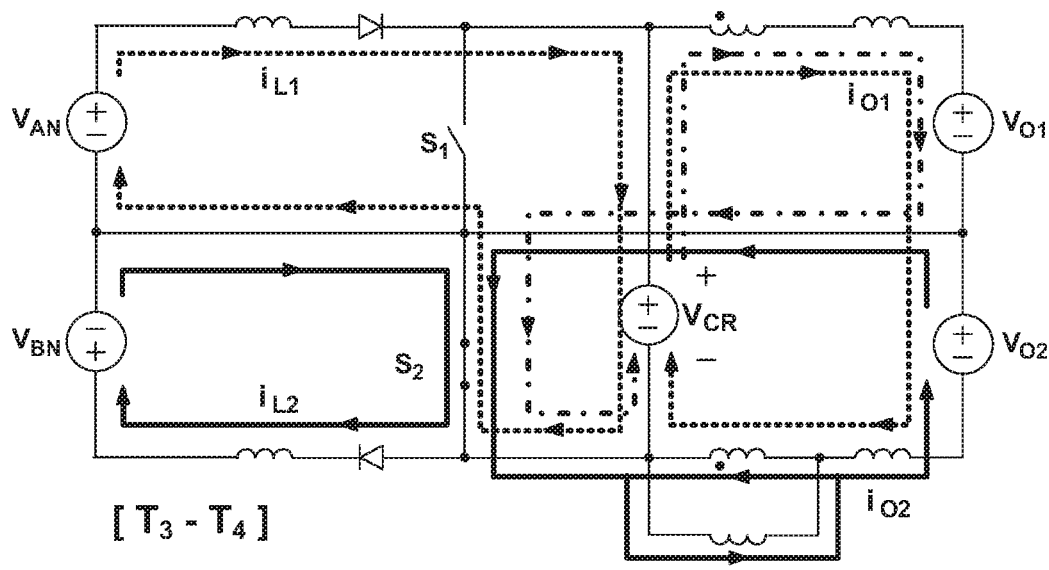

FIG. 5D shows the topological stage of schematic circuit representation 400 between times $T_3$ and $T_4$ of a switching cycle of switches $S_1$ and $S_2$, in accordance with one embodiment of the present invention. Inductor current $i_{L2}$ continues to flow in switch $S_2$. Current $i_{L1}$ in boost inductor $L_1$ decreases to zero at time $T_4$.

To maintain DCM operation, the period between times $T_3$ and $T_4$ is maintained at less than one-half of switching period $T_S$, resulting in inductor current $i_{L1}$ rising at a lesser rate than it falls. In this switching scheme, lowest voltage $V_{CR_{min}}$ across flying capacitor $C_R$, which results in lowest value $V_{O_{min}}$, is given by:

$$V_{CR_{min}} = 2 \times V_{AN_{PK}} = \sqrt{2} \times V_{AC,RMS} \quad (2)$$

where $V_{AN_{PK}}$ represents the peak phase voltage across input filter capacitor $C_1$, and $V_{AC,RMS}$ is the root-mean-square (RMS) value of input voltage $V_{AC}$. Because inductor currents $i_{L1}$ and $i_{L2}$ flow in opposite directions during the period between times $T_2$ and $T_4$, the average current through switch $S_2$ is less than the individual currents, resulting in a reduced power loss.

Figure 5E:
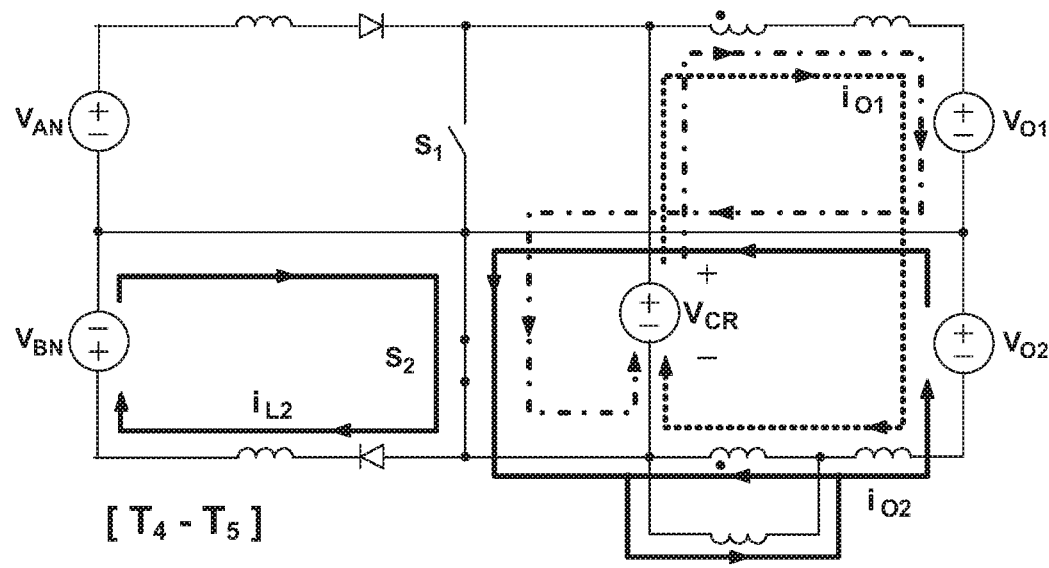

FIG. 5E shows the topological stage of schematic circuit representation 400 between times $T_4$ and $T_5$ of a switching cycle of switches $S_1$ and $S_2$, in accordance with one embodiment of the present invention. Between times $T_4$ and $T_5$, inductor current $i_{L2}$ continues to flow through switch $S_2$, increasing at the rate $$\frac{V_{BN}}{L_2},$$

and reaches peak value $I_{L2_{pk}}$ at time $T_5$, given approximately by:

$$I_{L2_{pk}} = \frac{V_{BN}}{L_2} \times \frac{T_S}{2} \quad (3)$$

where $V_{BN}$ is the phase voltage across input filter capacitor $C_2$. Equations (1) and (3) show that the peak values of inductor currents $i_{L1}$ and $i_{L2}$ are each proportional to its corresponding phase voltage for substantially equal inductor inductances $L_1$ and $L_2$.

Figure 5F:
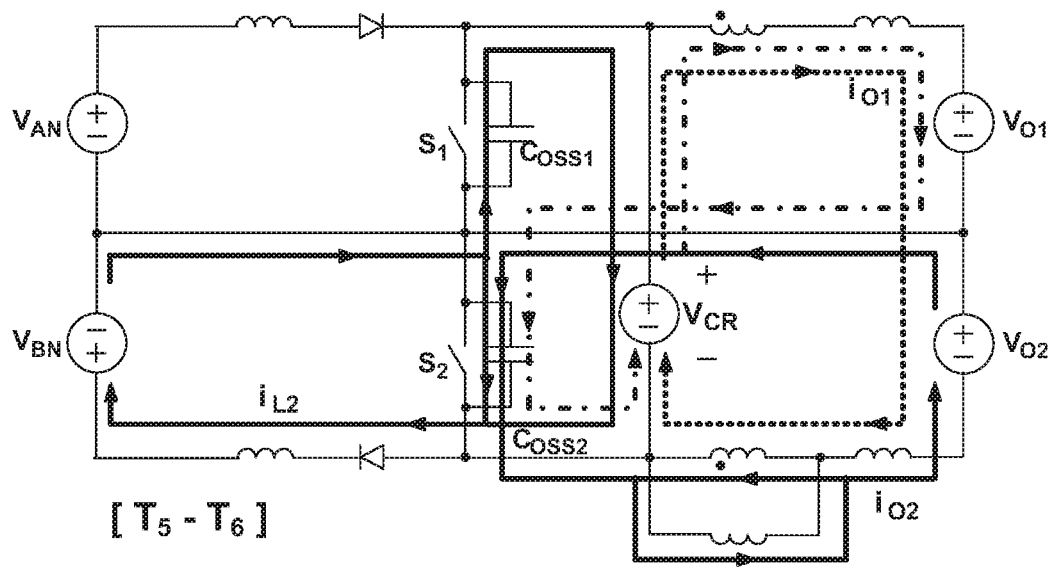

FIG. 5F shows the topological stage of schematic circuit representation 400 between times $T_5$ and $T_6$ of a switching cycle of switches $S_1$ and $S_2$, in accordance with one embodiment of the present invention. At time $T_5$, switch $S_2$ opens, so that inductor current $i_{L2}$ begins charging output capacitance $C_{OSS2}$ of switch $S_2$ and discharging output capacitance $C_{OSS1}$ of switch $S_1$.

Figure 5G:
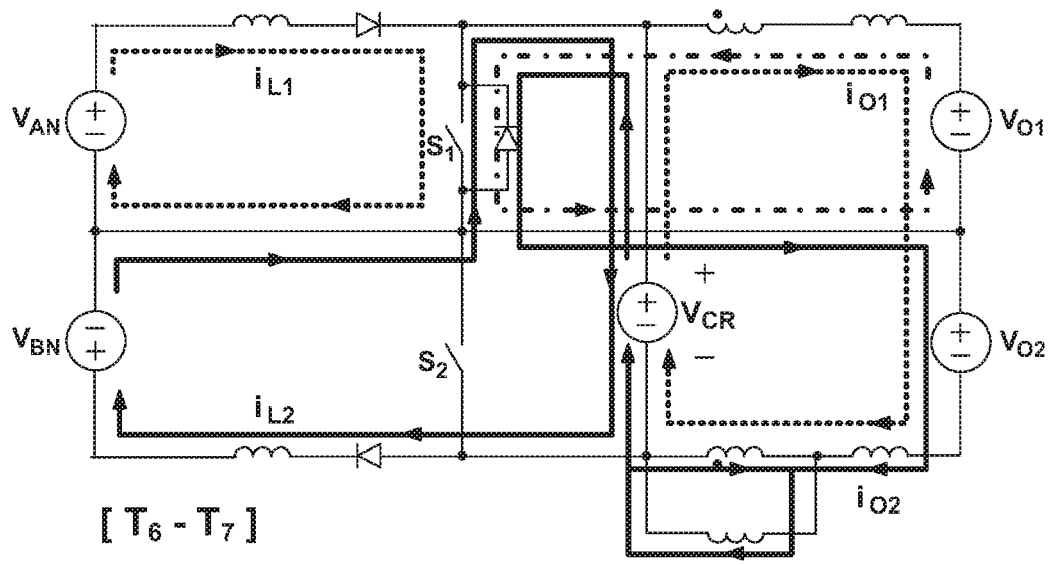

FIG. 5G shows the topological stage of schematic circuit representation 400 between times $T_6$ and $T_7$ of a switching cycle of switches $S_1$ and $S_2$, in accordance with one embodiment of the present invention. At time $T_6$, switch $S_1$'s output capacitance $C_{OSS1}$ is fully discharged and its anti-parallel diode begins to conduct. At the same time, switch $S_1$ may close with ZVS. As shown in FIG. 6, switch $S_1$ closes at time $T_7$.

Figure 5H:
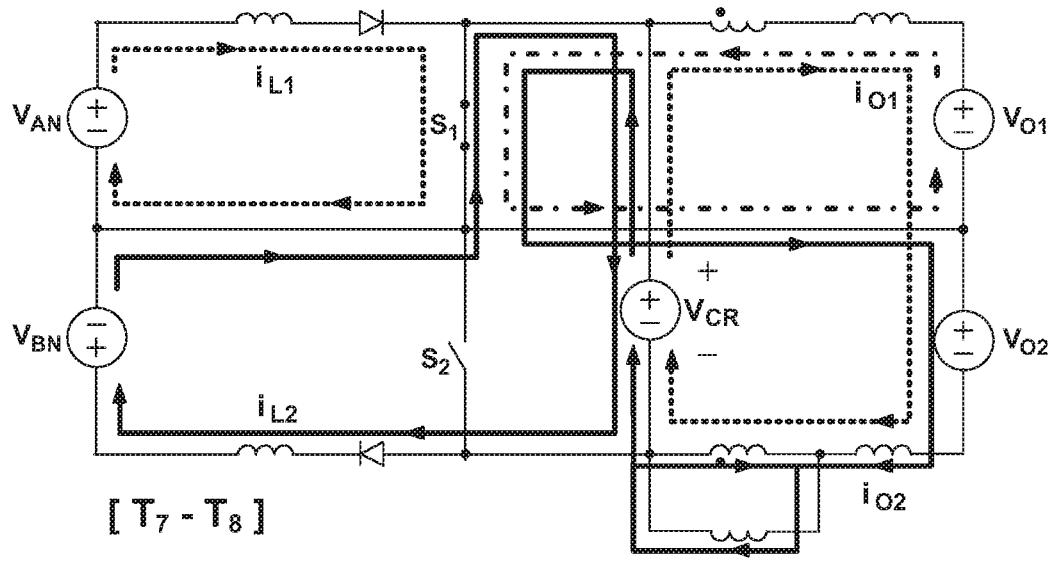

FIG. 5H shows the topological stage of schematic circuit representation 400 between times $T_7$ and $T_S$ of a switching cycle of switches $S_1$ and $S_2$, in accordance with one embodiment of the present invention. Once switch $S_1$ closes, inductor current $i_{L1}$, which is increasing, flows through switch $S_1$ in an opposite direction from inductor current $i_{L2}$, such that a current substantially equals to the difference between inductor currents $i_{L1}$ and $i_{L2}$ flow through switch $S_1$.

Figure 5I:
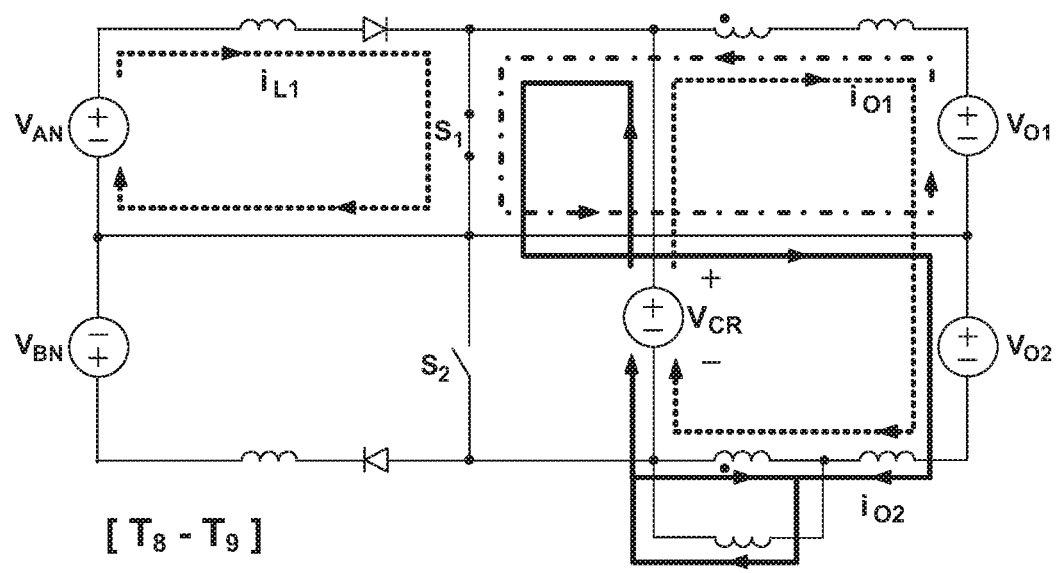

FIG. 5I shows the topological stage of schematic circuit representation 400 between times $T_S$ and $T_9$ of a switching cycle of switches $S_1$ and $S_2$, in accordance with one embodiment of the present invention. At time $T_8$, inductor current $i_{L2}$ reaches zero. A new switching cycle begins at time $T_9$, when switch $S_1$ opens.

As shown in FIG. 6, when switch $S_1$ or $S_2$ closes, its associated phase voltage is imposed across its connected boost inductor $L_1$ or $L_2$ through conducting diodes in the full-bridge rectifier. Conversely, when switch $S_1$ or $S_2$ opens, the associated phase voltage less voltage $V_{CR}$ across flying capacitor $C_R$ is imposed across its connected boost inductor $L_1$ or $L_2$, until the current $i_{L1}$ or $i_{L2}$ in that boost inductor reaches zero. Therefore, average inductor current $\langle I_{AVG} \rangle_{T_S}$ over switching cycle $T_S$ is given by:

$$\langle I_{AVG} \rangle_{T_S} = \frac{V_{CR}T_S}{8L}\left(\frac{\sqrt{2}\, V_{AC,RMS}\sin\omega t}{2V_{CR} - V_{AC,RMS}\sin\omega t}\right) \quad (4)$$

where L is the substantially equal inductance of boost inductors $L_1$ and $L_2$, and $\omega$ is the angular frequency of the line voltage. To achieve PFC, switching period $T_S$ is preferably proportional to $2V_{CR}-V_{AC,RMS}\sin\omega t$ or:

$$T_S = K(2V_{CR} - V_{AC,RMS}\sin\omega t) \quad (5)$$

where K is a constant. At such a switching frequency, Equation (6) becomes:

$$\langle I_{AVG} \rangle_{T_S} = \frac{V_{CR}K}{8L}\left(\sqrt{2}\, V_{AC,RMS}\sin\omega t\right) \quad (6)$$

As inductance L and voltage $V_{CR}$ across flying capacitor $C_R$ over switching period $T_S$ are both substantially constant, average inductor current $\langle I_{AVG} \rangle_{T_S}$ is therefore proportional to the input voltage $V_A = \sqrt{2}V_{AC,RMS}\sin\omega t$.

Returning to FIG. 3, the output signal from summer 363 is substantially the non-linear compensation term, $2V_{CR}-V_{AC,RMS}\sin\omega t$, of Equation (5). Therefore, the gate signals for switches $S_1$ and $S_2$ have a switching period $T_S$ that is proportional to the non-linear compensation term, $2V_{CR}-V_{AC,RMS}\sin\omega t$, of Equation (5)). Accordingly, PFC DCM boost rectifier 300 automatically achieves PFC without an active current-shaping control scheme.

Figure 7:
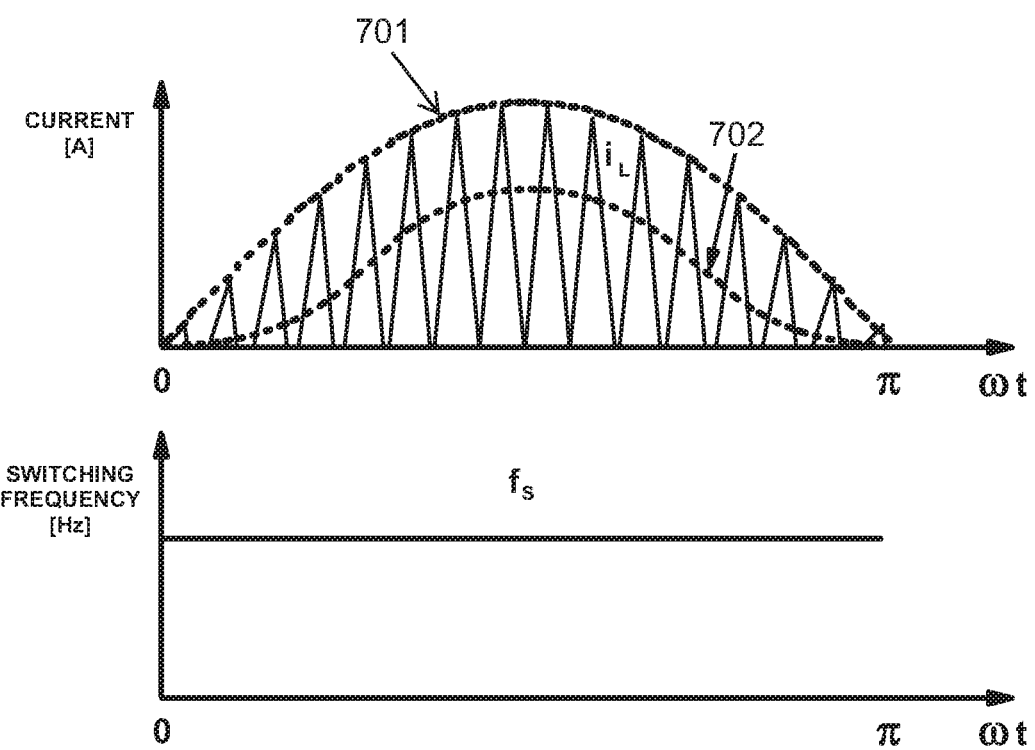
FIG. 7 shows, (i) peak and average input currents 701 and 702 of boost rectifier 300, and (ii) corresponding switching frequency $f_S$, over a positive half-cycle of input line voltage $V_{AC}$, when the non-linear compensation signal is not applied (i.e., setting the non-linear compensation term, $2V_{CR}$-$V_{AC,RMS}$ sin ωt, to 1 at multiplier 364).

FIG. 7 shows, (i) peak and average input currents 701 and 702 of PFC DCM boost rectifier 300, and (ii) corresponding switching frequency $f_S$, over a positive half-cycle of input line voltage $V_{AC}$, when the non-linear compensation signal is not applied (i.e., setting the non-linear compensation term, $2V_{CR}-V_{AC,RMS}\sin\omega t$, to 1 at multiplier 364). Switching frequency $f_S$ equals $$\frac{1}{T_S}.$$

Figure 8:
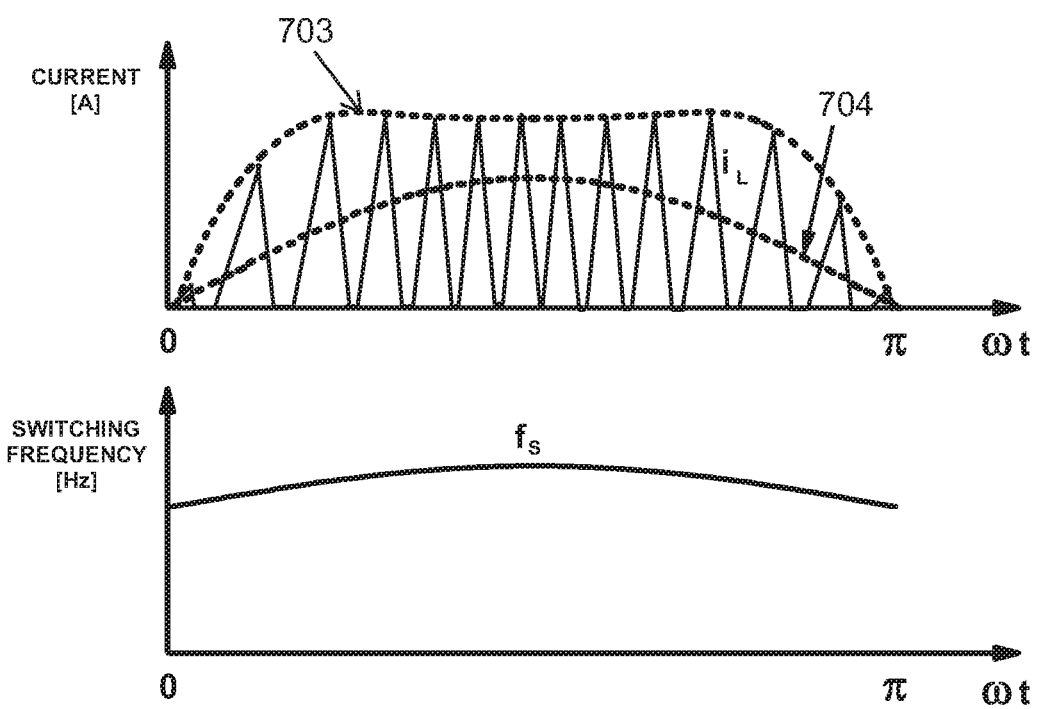
FIG. 8 shows, (i) peak and average input currents 703 and 704 of boost rectifier 300, and (ii) corresponding switching frequency $f_S$, over a positive half-cycle of input line voltage $V_{AC}$, with application of the non-linear compensation signal (i.e., multiplying non-linear compensation term, $2V_{CR}$-$V_{AC,RMS}$ sin ωt, to signal G at multiplier 364), in accordance with one embodiment of the present invention.

FIG. 8 shows, (i) peak and average input currents 703 and 704 of PFC DCM boost rectifier 300, and (ii) corresponding switching frequency $f_S$, over a positive half-cycle of input line voltage $V_{AC}$, with application of the non-linear compensation signal (i.e., multiplying non-linear compensation term, $2V_{CR}-V_{AC,RMS}\sin\omega t$, to signal G at multiplier 364), in accordance with one embodiment of the present invention. As shown in FIG. 8, switching frequency $f_S$ varies with input voltage $V_{AC}$ and output voltage $V_O$ according to the non-linear compensation term of Equation (5).

Figure 9:
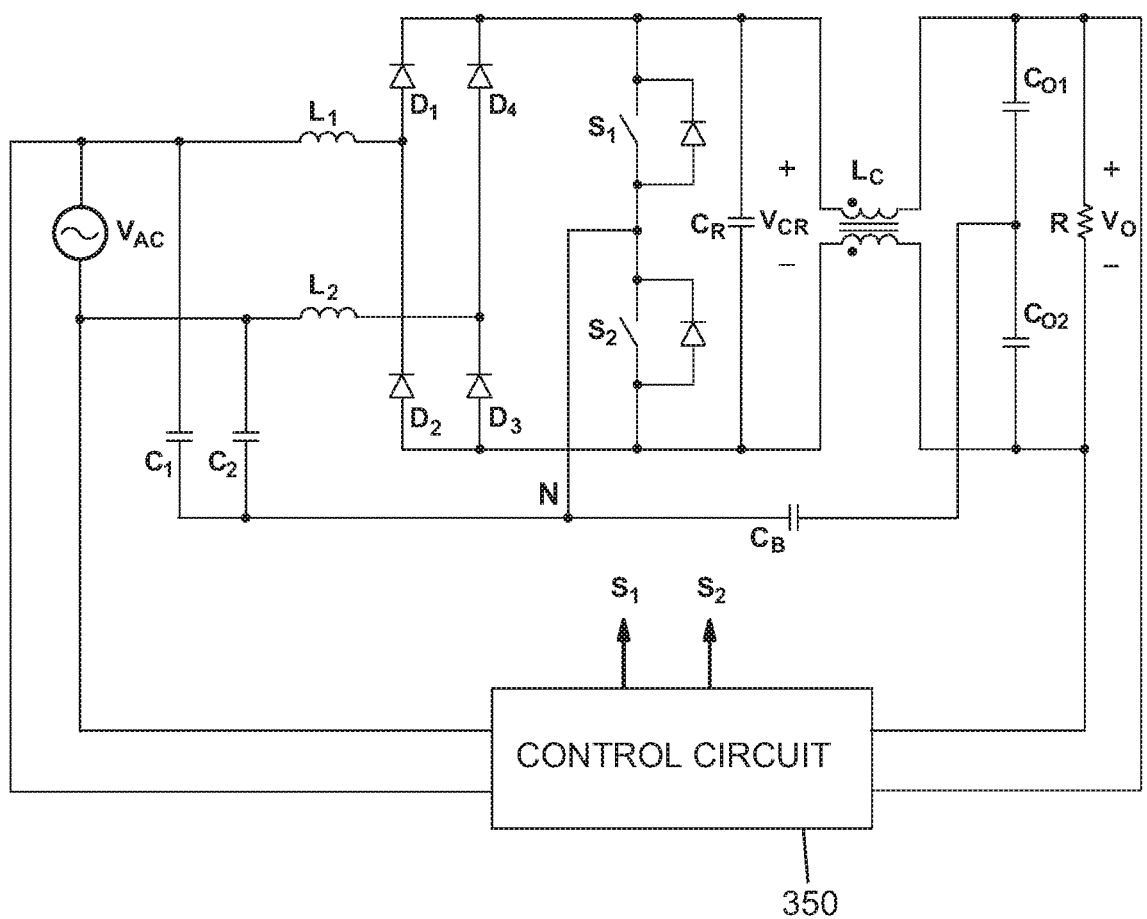
FIG. 9 shows boost rectifier 900, according to one embodiment of the present invention, which differs from boost rectifier 300 of FIG. 3 by having blocking capacitor CB between common node N between series-connected switches $S_1$ and $S_2$ and another common node between series-connected output capacitors $C_{O1}$ and $C_{O2}$.

Many variations and modifications within the scope of the present invention are possible. For example, FIG. 9 shows PFC DCM boost rectifier 900 of the present invention, which differs from PFC DCM boost rectifier 300 of FIG. 3 by having blocking capacitor CB between common node N between series-connected switches $S_1$ and $S_2$ and the common node between series-connected output capacitors $C_{O1}$ and $C_{O2}$. In this embodiment, the common terminal between series-connected output capacitors $C_{O1}$ and $C_{O2}$ in output stage 320 and the common terminal between series-connected switches $S_1$ and $S_2$ of switching converter stage 310 are connected by blocking capacitor CB. Blocking capacitor CB significantly attenuates any low-frequency current circulating common nodes N and the common node between output filter capacitors $C_{O1}$ and $C_{O2}$. Blocking capacitor CB may have a relatively much smaller capacitance than each of output capacitors $C_{O1}$ and Coe.

Figure 10:
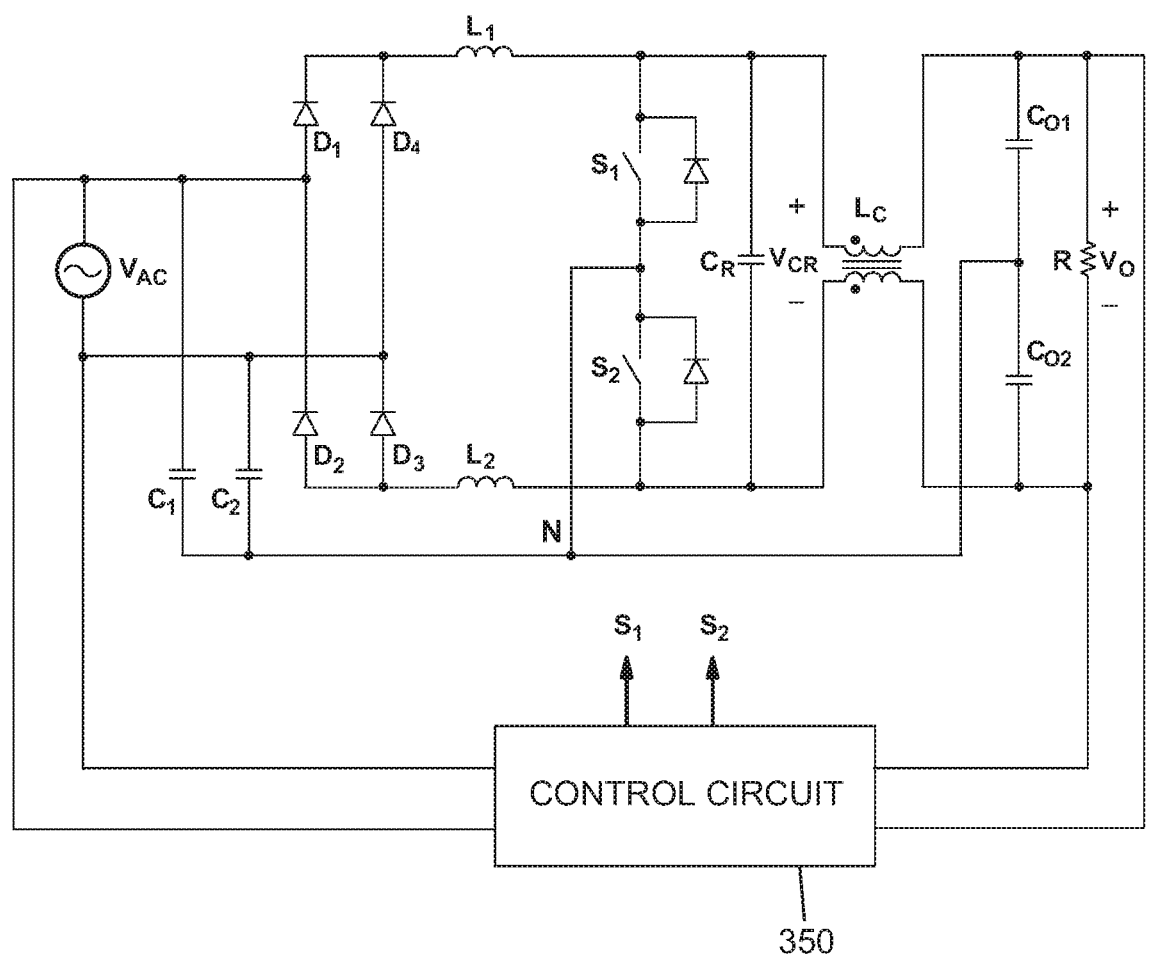
FIG. 10 shows boost rectifier 1000, according to one embodiment of the present invention, which differs from boost rectifier 300 of FIG. 3 by having boost inductors $L_1$ and $L_2$ downstream from a rectification circuit that includes diodes $D_1$ to $D_4$ in a full-bridge configuration.

FIG. 10 shows PFC DCM boost rectifier 1000 of the present invention, which differs from PFC DCM boost rectifier 300 of FIG. 3 by having boost inductors $L_1$ and $L_2$ downstream from the full-bridge rectifier of diodes $D_1$ to $D_4$.

Figure 11:
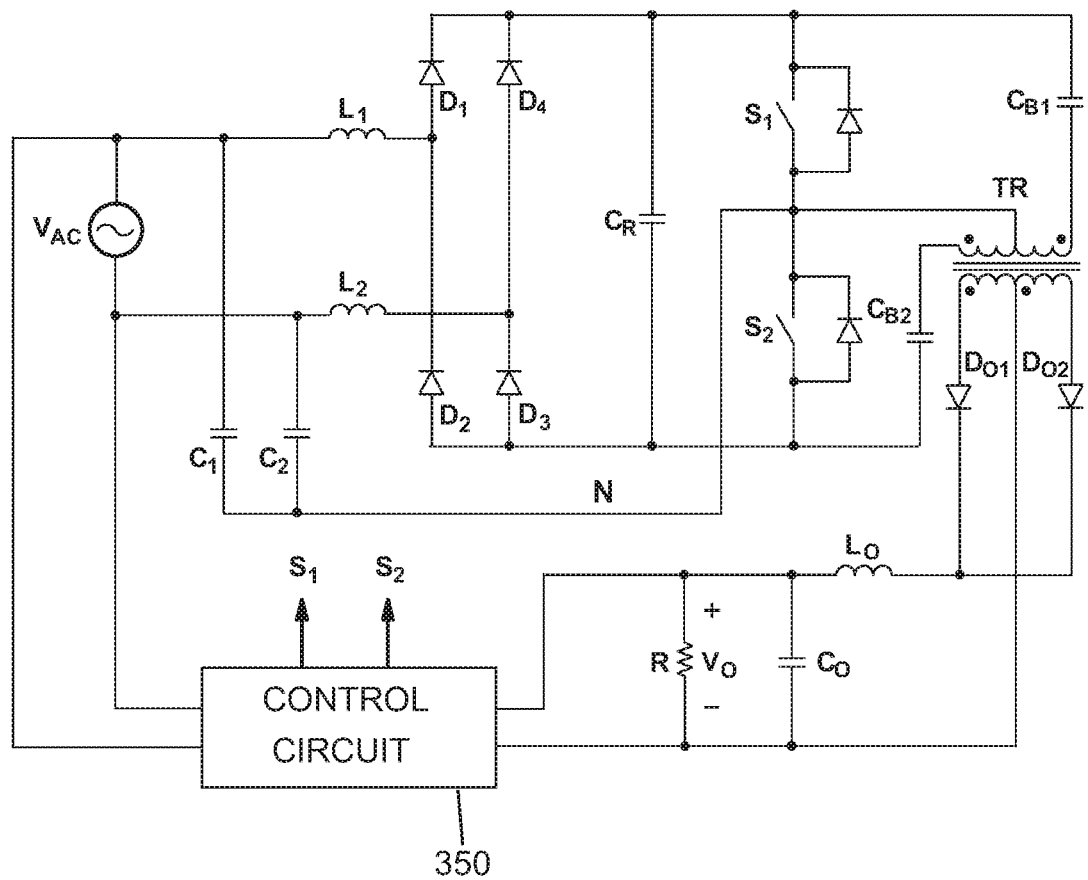
FIG. 11 shows boost rectifier 1100 having transformer TR in its isolated output stage, in accordance with one embodiment of the present invention.

FIG. 11 shows PFC DCM boost rectifier 1100 having transformer TR in its isolated output stage, in accordance with one embodiment of the present invention. As shown in FIG. 11, transformer TR includes a primary winding with a center-tap connected to the common terminal between the first and second switches $S_1$ and $S_2$ of the switching converter stage. PFC DCM boost rectifier 1100 replaces coupled inductor $L_C$ in PFC DCM boost rectifier 300 of FIG. 3 with transformer TR, which are center-tapped to provide virtual grounds in each of the primary and secondary windings. Blocking capacitors $C_{B1}$ and $C_{B2}$ connect respective terminals of the primary winding with the phase terminals of the switching converter stage. Rectifiers $D_{O1}$ and $D_{O2}$ are series-connected with the secondary winding of transformer TR, which is center-tapped to provide a virtual ground. The output stage of this embodiment may further include an output $L_C$ filter, which may include, as shown in FIG. 12, output inductor $L_O$ and output capacitor $C_O$ coupled between rectifiers $D_{O1}$ and $D_{O2}$ and output resistive load R.

Figure 12:
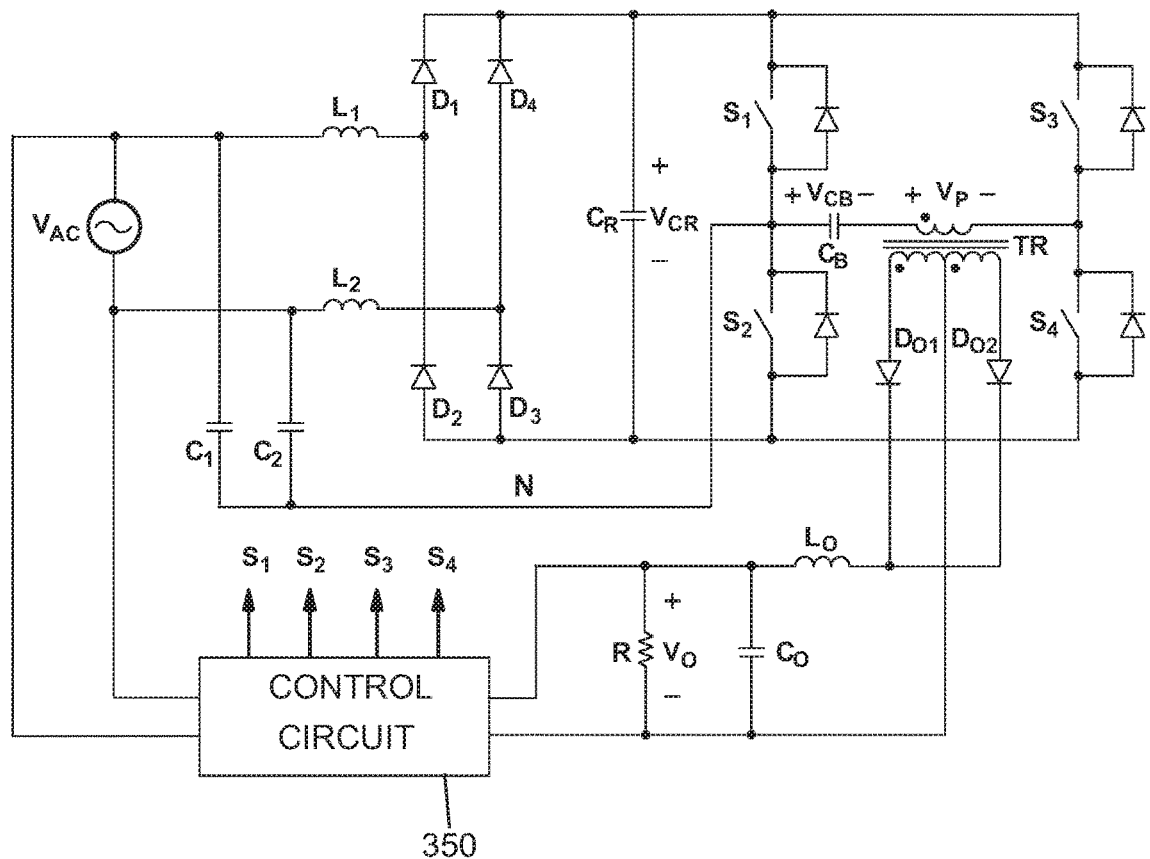
FIG. 12 shows boost rectifier 1200 operated by switches $S_1$ to $S_4$ in a full-bridge configuration, in accordance with one embodiment of the present invention.

FIG. 12 shows PFC DCM boost rectifier 1200 operated by switches $S_1$ to $S_4$ in a full-bridge configuration, in accordance with one embodiment of the present invention. In PFC DCM boost rectifier 1200, a series circuit including the primary winding of isolation transformer TR and blocking capacitor CB connects the common node between switches S and $S_2$ and the common node between switches $S_3$ and $S_4$, respectively. Relative to PFC DCM boost rectifier 300 of FIG. 3, having additional switches $S_3$ and $S_4$ form the full-bridge configuration with switches $S_1$ and $S_2$ achieves a higher power conversion.

Figure 13:
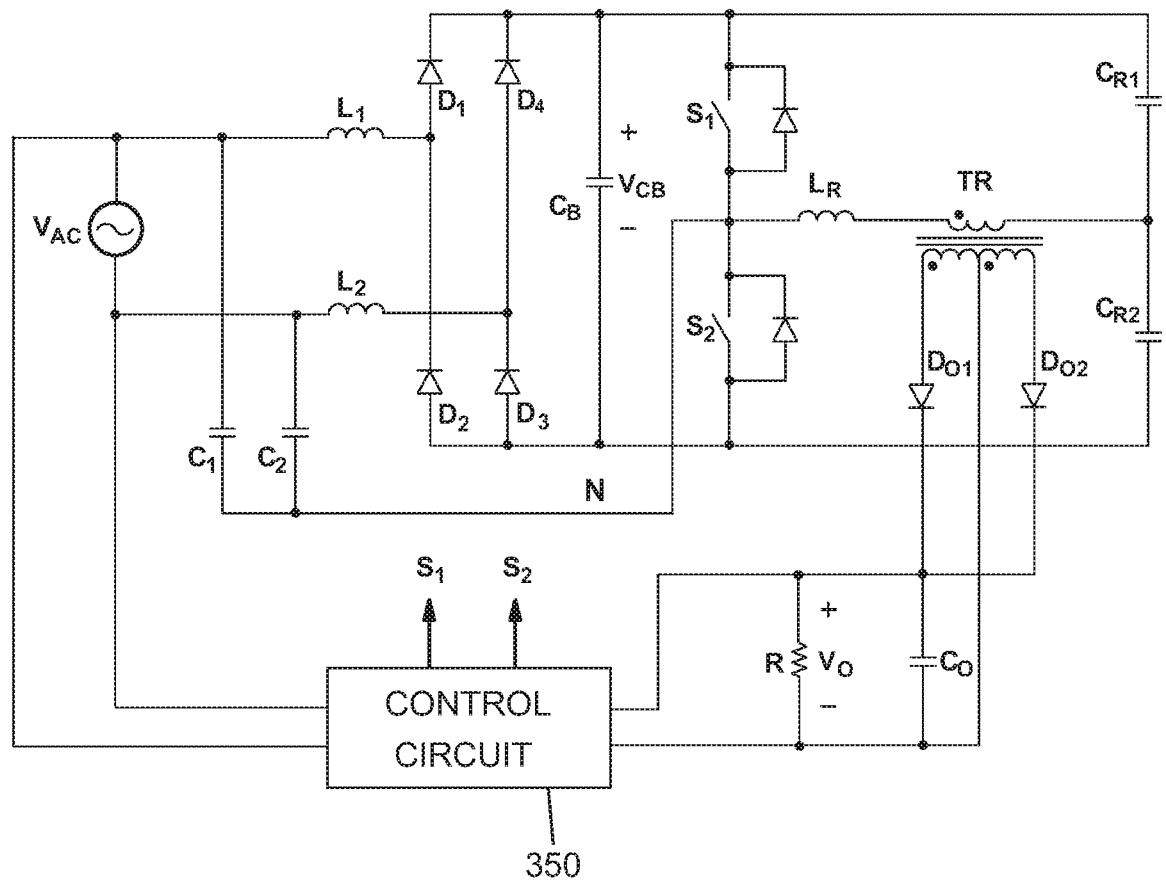
FIG. 13 shows boost rectifier 1300 operated by switches $S_1$ and $S_2$ in a half-bridge resonant-type circuit with resonant inductor LR and resonant capacitors $C_{R1}$ and $C_{R2}$, in accordance with one embodiment of the present invention.

FIG. 13 shows PFC DCM boost rectifier 1300 operated by switches $S_1$ and $S_2$ in a half-bridge resonant-type circuit with resonant inductor LR and resonant capacitors $C_{R1}$ and $C_{R2}$, in accordance with one embodiment of the present invention. In PFC DCM boost rectifier 1300, the primary winding of isolation transformer TR is connected in series with inductor $L_R$ between common node N and the common node between series-connected resonant capacitors $C_{R1}$ and $C_{R2}$, so as to form $L_C$ circuits between the common node N and each phase terminal of the switching converter stage. In this embodiment, transformer TR forms a decoupling stage, having its primary winding connected to the phase terminals of the switching converter stage by the resonant-type circuit.

Generally, such a resonant-type circuit may include one or more resonant inductors and one or more resonant capacitors. As shown in FIG. 13, this resonant-type circuit includes series-connected resonant capacitors $C_{R1}$ and $C_{R2}$ connected between the phase terminals of the switching converter stage, the common terminal between series-connected resonant capacitors $C_{R1}$ and $C_{R2}$, and to the primary winding of transformer TR. Thus, as shown in the example of FIG. 13, transformer TR has its primary winding connected to the phase terminals through a resonant-type circuit, which may include one or more resonant inductors and one or more resonant capacitors.

Figure 14:
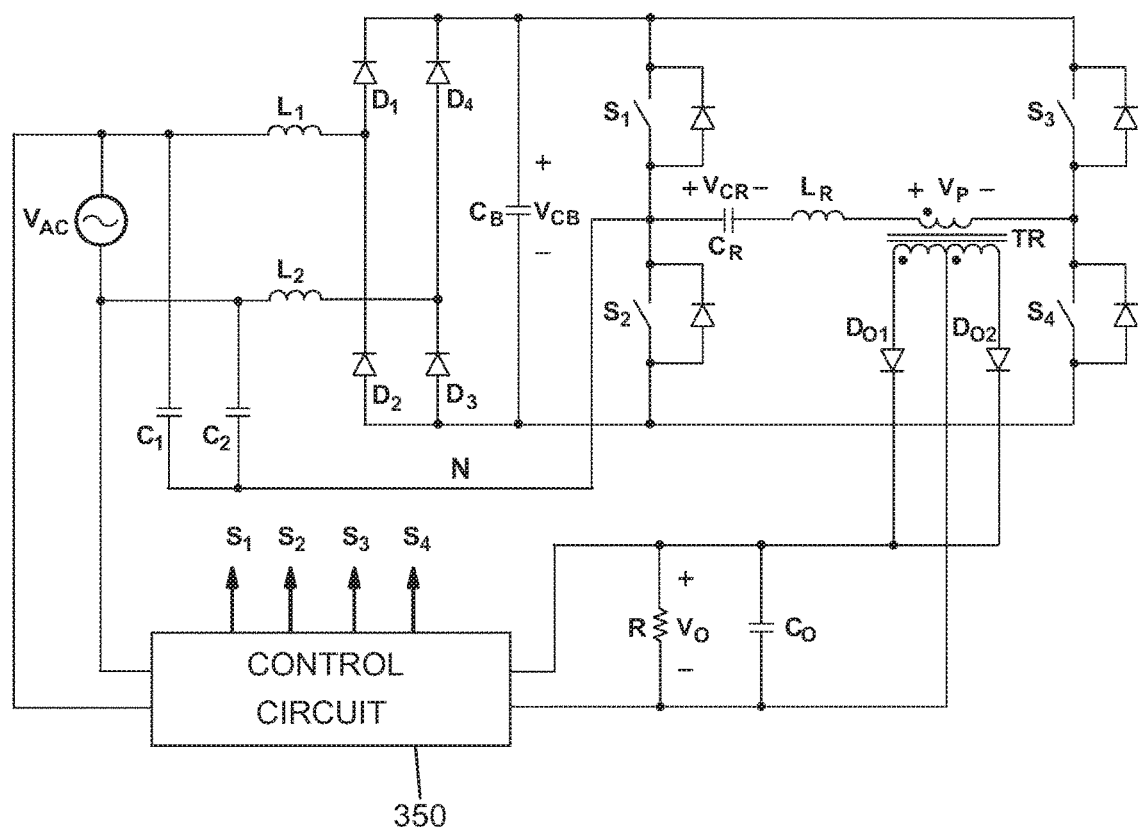
FIG. 14 shows boost rectifier 1400 operated by switches $S_1$ and $S_4$ in a full-bridge resonant-type circuit with resonant inductor LR and resonant capacitor CR, in accordance with one embodiment of the present invention.

FIG. 14 shows PFC DCM boost rectifier 1400 operated by switches $S_1$, $S_2$, $S_3$, and $S_4$ in a full-bridge resonant-type circuit with resonant inductor $L_R$ and resonant capacitor $C_R$, in accordance with one embodiment of the present invention. In PFC DCM boost rectifier 1400, the primary winding of isolation transformer TR is connected in series with inductor LR and resonant capacitor $C_R$ between common node N and the common node between series-connected switches $S_3$ and $S_4$, so as to form an $L_C$ circuit between the common node N and each phase terminal of the switching converter stage.

PFC DCM boost rectifiers of the present invention may operate with any resonant-type tank circuit, whether in series, in parallel, as LLC, LCC or LLCC resonant circuits, or in any suitable combination.

Therefore, this detailed description shows that, by incorporating a feedforward signal that incorporates a non-linear compensation term into an output voltage feedback control signal, boost converters of the present invention are capable of zero-voltage switching, a 5% or less input-current total harmonic distortion, and a regulated switching frequency. Because the low THD may be achieved without an additional wide-bandwidth, active current-shaping control scheme, HPF efficiency is achieved. In at least one embodiment, the non-linear compensation term is derived from both input and output voltages. Furthermore, the PFC DCM boost rectifiers and the PFC DCM boost rectifiers of the present disclosure have reduced common-mode noise.

The detailed description above is provided to illustrate specific embodiments of the present invention and is not intended to be limiting. The present invention is set forth in the accompanying claims.

We claim:

1. A boost rectifier, configured to operate with a single-phase input voltage, comprising:
   an input stage comprising (i) first and second terminals across which to receive the single-phase input voltage; and (ii) first and second input filter capacitors;
   a switching converter stage, having (a) input terminals coupled to the first and second terminals of the input stage, and (b) first and second phase terminals, the switching converter stage comprising:
   (i) a rectification circuit coupled between the input terminals and the f phase terminals;
   (ii) an inductor circuit comprising first and second boost inductors, coupled between the input terminals and the phase terminals;
   (iii) series-connected first and second switches providing a common terminal therebetween, wherein the common terminal is coupled by the first and second filter capacitors of the input stage, respectively, to the first and second terminals of the input stage; and
   (iv) a phase output capacitor connected between the first and second phase terminals;
   an output stage configured to transfer energy stored in the phase output capacitor to an output load;
   a decoupling stage configured to provide high-impedance decoupling between the switching converter stage and the output stage; and
   a control circuit configured to operate the first and second switches according to a non-linear compensation signal derived from (i) a magnitude of the single-phase input voltage; and (ii) a voltage across the output load or a current in the output load.

2. The boost rectifier of claim 1, wherein the rectification circuit comprises first, second, third, and fourth diodes connected in a full-bridge configuration.

3. The boost rectifier of claim 1, wherein the first and second boost inductors connect the first and second terminals of the input stage, respectively, to the rectification circuit.

4. The boost rectifier of claim 1, wherein the rectification circuit connects the first and second terminals of the input stage, respectively, to the first and second boost inductors.

5. The boost rectifier of claim 1, wherein the output stage comprises series-connected first and second output capacitors having a common terminal therebetween, and wherein the common terminal between the first and second output capacitors in the output stage and the common terminal between the first and second switches of the switching converter stage are connected.

6. The boost rectifier of claim 5, further comprising a blocking capacitor, wherein the common terminal between the first and second output capacitors in the output stage and the common terminal between the first and second switches of the switching converter stage are connected by the blocking capacitor.

7. The boost rectifier of claim 1, wherein the decoupling stage comprises a coupled inductor.

8. The boost rectifier of claim 1, wherein the decoupling stage comprises a transformer having a primary winding with a center-tap connected to the common terminal between the first and second switches of the switching converter stage.

9. The boost rectifier of claim 1, wherein the decoupling stage comprises a transformer having a primary winding connected to the phase terminals of the switching converter stage by a resonant-type circuit.

10. The boost rectifier of claim 9, wherein the resonant-type circuit comprises one or more resonant inductors and one or more resonant capacitors.

11. The boost rectifier of claim 10, wherein the resonant-type circuit comprises series-connected resonant capacitors connected between the phase terminals of the switching converter stage, the series-connected resonant capacitors having a common terminal coupled to the primary winding of the transformer.

12. The boost rectifier of claim 1, further comprising series-connected third and fourth switches in the switching converter stage, the third and fourth switches having a common terminal therebetween, and wherein the decoupling stage comprises a transformer having a primary winding connected between the common terminal between the first and second switches of the switching converter stage and the common terminal between the third and fourth switches of the switching converter stage.

13. The boost rectifier of claim 12, further comprising a resonant-type circuit coupled to the primary winding of the transformer and between the common terminal between the first and second switches of the switching converter stage and the common terminal between the third and fourth switches of the switching converter stage.

14. The boost rectifier of claim 1, wherein the decoupling stage comprises a transformer having a secondary winding with a center-tap that provides a virtual ground for the output stage.

15. The boost rectifier of claim 1, wherein the magnitude of the single-phase input voltage includes a root-mean-square value of the single-phase input voltage.

16. The boost rectifier of claim 1, wherein the control circuit determines a common switching cycle for the first and second switches based on the non-linear compensation signal.

17. The boost rectifier of claim 16, wherein the switching cycle is regulated by a control signal driving a voltage-controlled oscillator, the control signal being based on the non-linear compensation signal.

18. The boost rectifier of claim 17, wherein the control signal is a product of the non-linear compensation signal and a feedback signal based on the voltage across the output load or the current in the output load.

19. The boost rectifier of claim 1, wherein the control circuit combines a feedforward signal derived from input and output voltages of the boost rectifier with an output voltage feedback control signal.

20. The boost rectifier of claim 1, further comprising a non-linear compensation circuit which combines a feedforward signal derived from both the input and output voltages of the boost rectifier with an output voltage feedback control signal to generate an output signal that is used to operate the first and second switches.

* * * * *